(12) United States Patent
Keohane et al.

(10) Patent No.: US 7,831,923 B2
(45) Date of Patent: Nov. 9, 2010

(54) PROVIDING VISUAL KEYBOARD GUIDES ACCORDING TO A PROGRAMMABLE SET OF KEYS

(75) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 11/563,722

(22) Filed: Nov. 28, 2006

(65) Prior Publication Data

US 2008/0126977 A1    May 29, 2008

(51) Int. Cl.
    G06F 3/048 (2006.01)
(52) U.S. Cl. .................. 715/773; 715/822; 345/168
(58) Field of Classification Search .............. 715/773, 715/822; 345/168
    See application file for complete search history.

(56) References Cited

U.S. PATENT DOCUMENTS

| | | | |
|---|---|---|---|
| 4,938,712 A | 7/1990 | Black | |
| 5,635,958 A * | 6/1997 | Murai et al. | 345/168 |
| 5,736,976 A * | 4/1998 | Cheung | 345/168 |
| 5,963,671 A * | 10/1999 | Comerford et al. | 382/230 |
| 6,084,576 A | 7/2000 | Leu et al. | |
| 6,215,417 B1 * | 4/2001 | Krass et al. | 341/20 |
| 6,512,838 B1 * | 1/2003 | Rafii et al. | 382/106 |
| 6,574,083 B1 * | 6/2003 | Krass et al. | 361/115 |
| 6,611,253 B1 * | 8/2003 | Cohen | 345/168 |
| 6,618,425 B1 | 9/2003 | Carlesi et al. | |
| 6,684,347 B1 | 1/2004 | Coffey | |
| 6,691,188 B2 | 2/2004 | Bae | |
| 6,710,770 B2 * | 3/2004 | Tomasi et al. | 345/168 |
| 6,808,116 B1 | 10/2004 | Eslambolchi et al. | |
| 6,861,585 B1 | 3/2005 | Kiely | |

(Continued)

OTHER PUBLICATIONS

Nakatani et al., "TNT: A Talking Tutor 'N' Trainer for Teaching the Use of Interactive Computer Systems", CHI'86 Proceedings, Apr. 1986, pp. 29-34.

(Continued)

*Primary Examiner*—Tadesse Hailu
*Assistant Examiner*—Patrick F Riegler
(74) *Attorney, Agent, or Firm*—Stephen J. Walder, Jr.; Steven L. Bennett (57) ABSTRACT

Mechanisms for providing visual keyboard guides according to a programmable set of keys are provided. With the mechanisms of the illustrative embodiments, a user may select for which keys of a keyboard the user wishes to receive visual guides on a display of a data processing device associated with the keyboard. Thereafter, when the user's fingers are in proximity to keys of the keyboard, a comparison of the keys in proximity to the user's instrument to the keys for which visual guides are to be provided is made. If the keys in proximity to the user's instrument match keys for which visual guides are to be provided, a visual guide is displayed on the display of the data processing device. A graphical user interface may be provided to the user for setting which keys are to have associated visual guides.

13 Claims, 5 Drawing Sheets

U.S. PATENT DOCUMENTS

| | | | |
|---|---|---|---|
| 6,975,242 B2 | 12/2005 | Dannenmann et al. | |
| 6,980,199 B2 * | 12/2005 | Rekimoto | 345/169 |
| 7,014,500 B2 | 3/2006 | Belesimo | |
| 7,161,587 B2 * | 1/2007 | Beck et al. | 345/168 |
| 7,177,902 B2 * | 2/2007 | Hubbard | 709/203 |
| 7,187,368 B2 * | 3/2007 | Rekimoto | 345/174 |
| 7,305,368 B2 * | 12/2007 | Lieberman et al. | 706/14 |
| 7,358,956 B2 * | 4/2008 | Hinckley et al. | 345/156 |
| 7,602,382 B2 * | 10/2009 | Hinckley et al. | 345/173 |
| 2002/0118175 A1 * | 8/2002 | Liebenow et al. | 345/168 |
| 2003/0021580 A1 | 1/2003 | Matthews | |
| 2004/0113956 A1 * | 6/2004 | Bellwood et al. | 345/863 |
| 2005/0104855 A1 * | 5/2005 | Grossmeyer | 345/169 |
| 2005/0116929 A1 | 6/2005 | Molander et al. | |
| 2006/0114233 A1 * | 6/2006 | Radivojevic et al. | 345/168 |
| 2006/0187211 A1 * | 8/2006 | Uusitalo et al. | 345/169 |

OTHER PUBLICATIONS

Zhai et al., "Movement Model, Hits Distribution and Learning in Virtual Keyboarding", CHI 2002, ACM, letters chi, vol. 4, issue No. 1, Apr. 20-25, 2002, pp. 17-24.

Zhai et al., "The Metropolis Keyboard—An Exploration of Quantitative Techniques for Virtual Keyboard Design", UIST '00, ACM, 2000, CHI Letters, vol. 2, 2, pp. 119-128.

* cited by examiner

PROVIDING VISUAL KEYBOARD GUIDES ACCORDING TO A PROGRAMMABLE SET OF KEYS

BACKGROUND

1. Technical Field

The present application relates generally to an improved data processing system and method. More specifically, the present application is directed to a system and method for providing visual keyboard guides according to a programmable set of keys.

2. Description of Related Art

In conventional keyboards, in order to provide a guide by which a user may determine whether their fingers are properly positioned on the keyboard keys, a set of indentions or raised portions on the physical keys are provided. Typically, these tactile guides are provided on the "F" and "J" keys of a QWERTY keyboard. From this initial reference point, most keyboard typists are expected to know the relative reach to the other keys on the keyboard. However, for some users, there are special keys, such as the "F1" through "F12" keys and the number keys, that are not typically used during daily use and may be difficult to intuitively reach. There are also times when users are not absolutely sure as to which special keys they are touching. Moreover, there are conditions, such as low light conditions, under which a user may not be able to determine which keys they are touching because they are unable to see the characters imprinted on the keys.

The problems associated with determining finger position relative to keyboard keys is made even greater with the advent of new virtual keyboards. With such virtual keyboards, the keys are projected onto a flat surface using a laser light or other light source. Pressing of the keys is detected through monitoring the motion of a user's hands relative to the projected keyboard. Such virtual keyboards do not provide ay tactile guide for informing the user of hand position relative to the keyboard.

SUMMARY

The illustrative embodiments provide a system and method that provides visual keyboard guides according to a programmable set of keys. With the mechanisms of the illustrative embodiments, a user may select for which keys of a keyboard the user wishes to receive visual guides on a display of a data processing device associated with the keyboard. Thereafter, when the user's instrument, e.g., finger tip(s), stylus, prosthetic device, pointer, or the like, are in proximity to keys of the keyboard, a comparison of the keys in proximity to the user's instrument to the keys for which visual guides are to be provided is made. If the keys in proximity to the user's instrument match keys for which visual guides are to be provided, a visual guide is displayed on the display of the data processing device. For purposes of simplification of the description, the user's instrument will be considered to be a user's finger tip(s), although as stated above, the user's instrument may take other forms other than a user's finger tip(s).

The visual guides are preferably provided in conjunction with the use of a smart keyboard. The smart keyboard detects the presence of a user's finger tips in proximity to individual keys of the smart keyboard without the user having to actually depress the keys of the keyboard. For example, the smart keyboard may detect the presence of the user's finger tips based on heat sensors in the keys, pressure sensors in the keys, light beam based detectors provided in the keys, motion sensors, or any other mechanism that may be used to detect the position of a user's finger tips relative to keys of a keyboard without having to have the keys actually depressed to thereby register an input of the key for typing purposes. Moreover, the smart keyboard may be a physical keyboard similar to conventional keyboards or may be a virtual keyboard, such as a projected keyboard or the like.

In one illustrative embodiment, a device driver is provided for communicating between the keyboard and the operating system of the data processing device with which the keyboard is associated. The device driver provides the logic for interpreting inputs from the keyboard and providing information to the operating system for utilizing the interpreted keyboard inputs. In accordance with the illustrative embodiments, the device driver further determines if the keys of the keyboard over which the user's finger tips are placed correspond to keys for which visual guides are desired by the user. If so, the device driver provides instructions to the operating system for displaying a visual guide on the display of the data processing device.

A graphical user interface may be provided to the user for setting which keys are to have associated visual guides. Moreover, via the graphical user interface, a user may select a portion of a display of the data processing device where the visual guides are to be displayed. Other characteristics of the visual guides may likewise be specified via this graphical user interface.

In one illustrative embodiment, the selection of keys for which visual guides are to be provided may be used as a basis for turning on/off sensors in a smart keyboard for detecting the presence of a user's finger tips relative to the keys of the keyboard. For example, based on the particular keys selected for visual guides, only the sensors associated with these keys maybe enabled. In this way, power savings may be achieved by disabling the sensors associated with keys for which visual guides are not necessary. Moreover, turning off such sensors helps to minimize the possibility that there may be incorrect detection of a user's finger tip position.

In a further illustrative embodiment, rather than providing a separate visual guide for indicating the current position of a user's finger tips over keys of the keyboard, existing characters being visually represented on the display of the data processing device may be used to provide the visual guide. That is, for example, if a document is being displayed, such as part of a word processing application instance running on the data processing device, existing instances of a character in the document may be highlighted or otherwise emphasized to indicate the current position of the user's finger tips over keys of the keyboard.

With such an embodiment, the text of the currently active portion of the display, e.g., the currently active window of being visually represented on the display, may be analyzed to identify instances of a character corresponding to a character associated with a key over which the user's finger tip is detected as being present. One or more instances of the character in the active portion of the display may then be identified and highlighted in the display, such as by changing a color of the character, a size of the character, a font of the character, italicizing or bolding the character, or any other means by which the character may be emphasized in the display of the active portion of the display. Alternatively, such analysis may be applied to non-active portions of the display or both active and non-active portions of the display.

In one illustrative embodiment, a method for providing visual keyboard guides is provided. The method may comprise receiving an input from a smart keyboard indicating at least one key of the smart keyboard with which a user's instrument is in proximity, the smart keyboard having sensors for detecting a presence of the user's instrument in proximity to the at least one key of the smart keyboard. The method may further comprise determining if visual keyboard guides are to be provided for the at least one key of the smart keyboard and outputting a visual keyboard guide on a display of the data processing device if visual keyboard guides are to be provided for the at least one key of the smart keyboard. The user's instrument may be a finger tip, a prosthetic device, a pointing device, or a stylus, for example.

The visual keyboard guide may be one of an opaque image represented on the display having a displayed character matching a character corresponding to the at least one key or a visual display of a keyboard with the at least one key being emphasized in the visual display of the keyboard. Outputting the visual keyboard guide on the display of the data processing device may comprise identifying a character currently being output by the display that corresponds to a character associated with the at least one key of the smart keyboard and emphasizing a representation of the character currently being output by the display in the output of the display.

The method may further comprise receiving user input specifying one or more keys of the smart keyboard for which visual guides are to be provided in response to detecting a presence of a user's instrument over the one or more keys. An identifier of the one or more keys may be stored in a data structure for use in determining if visual keyboard guides are to be provided for the at least one key of the smart keyboard. Determining if visual keyboard guides are to be provided for the at least one key of the smart keyboard may comprise comparing the at least one key to identifiers of one or more keys in the data structure and determining if there is a match between the at least one key and an identifier of a key in the data structure.

The method may further comprise receiving user input specifying one or more keys of the smart keyboard for which visual guides are to be provided in response to detecting a presence of a user's instrument over the one or more keys. A control signal may be sent to the smart keyboard to turn on/off sensors of the smart keyboard based on the user input specifying the one or more keys.

The method may further comprise receiving user input specifying a delay time for indicating the presence of the user's instrument over keys of the smart keyboard. The presence of the user's instrument over keys of the smart keyboard, in one illustrative embodiment, must be detected by sensors of the smart keyboard for a time corresponding to the delay time before the smart keyboard sends an input to the data processing device.

The smart keyboard may detect a presence of the user's instrument in proximity to the at least one key of the smart keyboard using at least one of a pressure sensor, a heat sensor, a light beam based sensor, or a motion sensor. The smart keyboard may be a light projected virtual keyboard that is projected onto a flat surface using a light source.

The method may further comprise providing a first portion of a user interface for specifying which keys of the smart keyboard are associated with visual guides to be output by the display in response to detecting the presence of the user's instrument over the keys of the smart keyboard. The method may also comprise providing a second portion of a user interface for specifying a portion of a visual representation generated by the display in which the visual guides are to be output. Moreover, the method may comprise providing a third portion of the user interface for specifying characteristics of the visual guides to be output.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
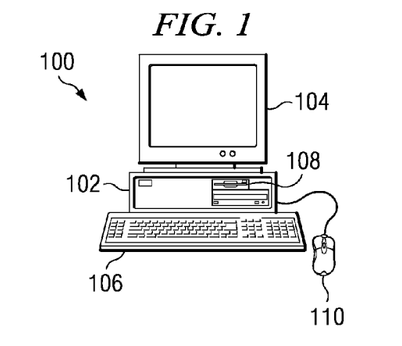
FIG. 1 is an exemplary pictorial representation of a data processing system in accordance with one illustrative embodiment.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

It should be appreciated that while FIG. 1 illustrates a physical keyboard that the user may physically touch with his/her hands and fingers, the illustrative embodiments are not limited to such. Rather, a virtual keyboard, such as a projected keyboard, may be utilized without departing from the spirit and scope of the present invention. For example, instead of a physical keyboard, a laser light projection system may be provided coupled to the system unit 102 that projects a virtual keyboard onto a flat surface using laser light or another type of focused light beam. Sensors may be provided in the projection system for detecting the user's interaction with the virtual keyboard.

The keyboard 106, in accordance with the mechanisms of the illustrative embodiments, is preferably a "smart keyboard." The term "smart keyboard" is meant to refer to keyboards having sensors for detecting a position of a user's instrument, e.g., finger tip(s), stylus, prosthetic device, pointer, or the like, relative to the keys of the keyboard without requiring the user to actually fully depress the keys to thereby input a keyboard command. To the contrary, without registering a conventional keyboard input through depressing of keys, the sensors of the smart keyboard sense the position of the user's instrument when the user's instrument is in proximity to the keys of the keyboard. Input signals from the keyboard to the system unit 102 indicate the position of the user's instrument relative to the keys of the keyboard 106, as well as other input signals that are known with conventional keyboards.

It should be appreciated that, for purposes of simplification of the description, the user's instrument will be considered to be a user's finger tip(s). However, as stated above, the user's instrument may take other forms other than a user's finger tip(s) including a stylus, prosthetic device, pointing device, or any other device that may be used to depress a key of a keyboard on behalf of the user.

The sensors in the keyboard 106 may be any of a number of different types of sensors. For example, the sensors may be pressure sensors, heat sensors, light beam based sensors, motion sensors, or the like. For example, with pressure sensors, the sensors may detect multiple levels of pressure applied to the keys of the keyboard 106. A light pressure level may be indicative of the user resting his/her instrument, e.g., finger tips, on the keys of the keyboard 106 but without fully depressing the keys. A heavier pressure level may be indicative of the actual depressing of the keys of the keyboard 106.

With heat sensors, the sensor may detect the presence of a heat source, such as the body heat of a user radiating through the finger tips of the user, in close proximity to the keys. The heat sensors may sense the user's finger tips being in close proximity to the keys without the user having to fully depress the keys of the keyboard 106.

With light beam based sensors, the sensors may detect the interruption of the light beam or the reflection of the light beam in response to the user's finger tips being in close proximity to the keys of the keyboard. Such detection, again, can be done without having the user fully depress the keys of the keyboard. Similarly, motion sensors may be used to detect the motion of a user's hands and finger tips so as to determine where, in relation to a physical or virtual keyboard, the user's finger tips are present without requiring the user to fully depress or actuate keys of the keyboard.

Any sensor that is capable of detecting the presence of a user's finger tips in close proximity to keys of a keyboard 106 may be used without departing from the spirit and scope of the present invention. The sensors mentioned above are only exemplary and are not intended to state or imply any limitation with regard to the types of sensors that may be used with the mechanisms of the illustrative embodiments.

The keyboard 106 communicates with the system unit 102 by providing input signals, and optionally receiving signals from the system unit 102, which are interpreted by software running in the system unit 102. This software may be, for example, a driver application which is used to interpret hardware based input signals and output data to an operating system running in the system unit 102. A block diagram of the system unit 102 is provided in FIG. 2 to illustrate the mechanisms by which such input signals are provided to units in the system unit 102.

Figure 2:
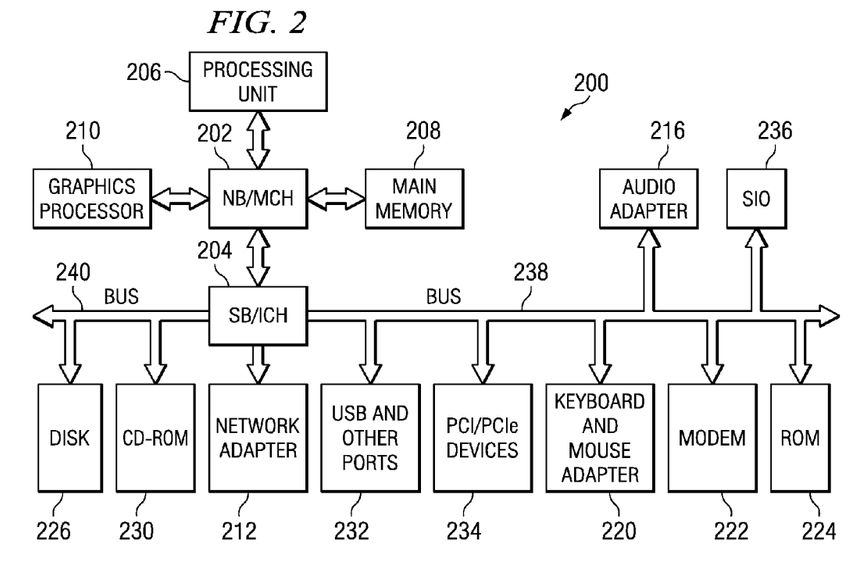
FIG. 2 is an exemplary block diagram of the internal units of a data processing system in accordance with one illustrative embodiment.

With reference now to FIG. 2, a block diagram of an exemplary data processing system is shown in which aspects of the illustrative embodiments may be implemented. Data processing system 200 is an example of system unit, such as system unit 102 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, wired or wireless telephone or other communication device, a personal digital assistant (PDA), video game system or device, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With regard to the illustrative embodiments, the keyboard and mouse adapter 220 provides a mechanism through which input signals from a keyboard may be received and control signals may be sent to the keyboard, such as keyboard 106. The input signals and control signals may pass through a device driver for the keyboard which is programmed with logic for interpreting the various inputs from the keyboard and for providing control signals to the keyboard in response to settings established for the keyboard, such as through a graphical user interface manipulated by a user to control the operation of the keyboard.

The device driver, or an application running in association with the device driver, may provide graphical output via a display device associated with the data processing system 200 for displaying visual guides based on detected positions of the user's finger tips relative to the keyboard's keys. These visual guides may take many different forms. In one illustrative embodiment, the visual guides may be ghost images, i.e. opaque images through which graphics "behind" the opaque image may still be seen, displayed on the display of the data processing system 200 that depict the letter, number, symbol, or other character(s) corresponding to the key or keys over which the user's finger tips are currently positioned.

With the mechanisms of the illustrative embodiments, a user may select, such as via a graphical user interface or the like, the key or keys for which the user wishes to receive visual guides on a display of a data processing system associated with the keyboard. Thereafter, when the user's fingers are in proximity to keys of the keyboard, a comparison of the keys in proximity to the user's finger tips to the keys for which visual guides are to be provided is made. If the keys in proximity to the user's finger tips match keys for which visual guides are to be provided, a visual guide is displayed on the display of the data processing device.

In one illustrative embodiment, the selection of keys for which visual guides are to be provided may be used as a basis for turning on/off sensors in a smart keyboard for detecting the presence of a user's finger tips relative to the keys of the keyboard. For example, based on the particular keys selected for visual guides, only the sensors associated with these keys may be enabled. In this way, power savings may be achieved by disabling the sensors associated with keys for which visual guides are not necessary. Moreover, turning off such sensors helps to minimize the possibility that there may be incorrect detection of a user's finger tip position.

Figure 3:
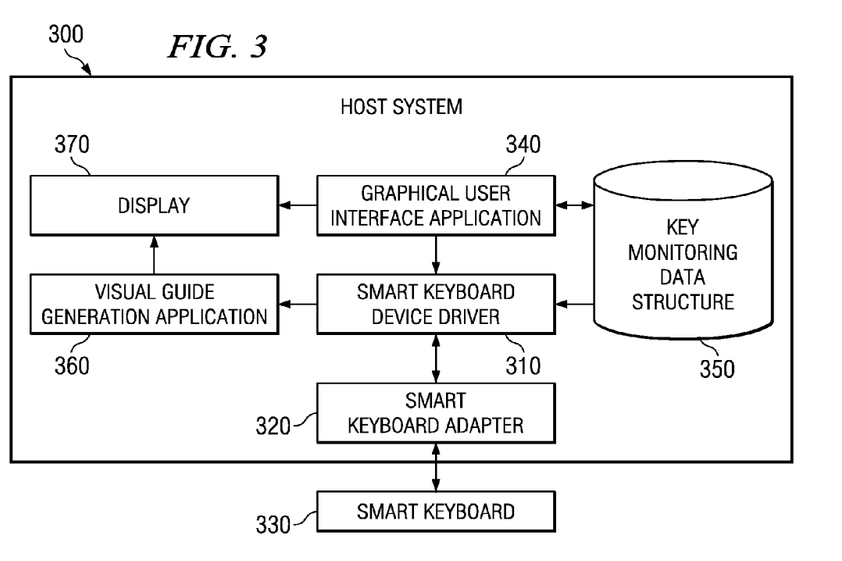
FIG. 3 is an exemplary block diagram of the primary operational components according to one illustrative embodiment.

FIG. 3 is an exemplary block diagram of the primary operational components according to one illustrative embodiment. As shown in FIG. 3, the primary operational components of a host system 300, in accordance with an illustrative embodiment, include a smart keyboard device driver 310, a smart keyboard adapter 320, a smart keyboard 330, a graphical user interface application 340, a key monitoring data structure 350, a visual guide generation application 360, and a display 370. The elements 310, 320, 340, 350, and 360 may be provided as software, hardware, or any combination of software and hardware components. For example, in one illustrative embodiment, these elements may be provided as software instructions executed in one or more data processing devices. The display 370 is preferably implemented as hardware, such as a conventional CRT monitor, LCD monitor, or the like. The smart keyboard 330 is preferably provided as a hardware device but may include some software components for processing inputs from a user, outputs to the smart keyboard adapter 320, inputs from the smart keyboard adapter 320 for configuring the smart keyboard 330, or the like.

While FIG. 3 shows these elements 310-360 as separate elements, one or more of the elements may be combined together into a combined element without departing from the spirit and scope of the present invention. For example, the visual guide generation application 360 may be integrated with the smart keyboard device driver 310. Other combinations of elements may be made without departing from the spirit and scope of the present invention.

The smart keyboard 330 may be any type of smart keyboard that is capable of detecting the position of a user's finger tips over keys of the keyboard 330 without requiring the full depression of the keys by the user's finger tips. As discussed above, such smart keyboards 330 may include keyboards having heat sensors provided in the keys, motion sensors, pressure sensors, light beam based sensors, or the like, that detect the presence of a user's finger tips over keys of the keyboard 330 but without the user's finger tips fully depressing the keys.

The smart keyboard 330 provides input signals to the smart keyboard adapter 320 indicative of keys depressed by the user as well as input signals from the sensors indicating the position of the user's finger tips over the keys of the keyboard 330. The smart keyboard 330 may further receive control signals from the smart keyboard device driver 310 via the smart keyboard adapter 320 to thereby configure the smart keyboard 330, as discussed in greater detail hereafter.

In operation, a user may provide input via the graphical user interface application 340 to specify characteristics for monitoring keys of the smart keyboard 330 and providing a display of visual guides. For example, the graphical user interface application 340 may be used to allow a user to select characteristics of the display of the visual guides, such as color, position, type of visual guide, duration of display of the visual guide, amount of time between a first detection of a user's finger tip and displaying of the visual guide, and the like. Moreover, via the graphical user interface application 340, the user may select which keys of the smart keyboard 330 are to be monitored for the presence of a user's finger tips in close proximity to the keys. The keys specified may comprise all of the keys of the smart keyboard 330, subsets of keys of the smart keyboard 330, or even individual keys of the smart keyboard 330. For example, the subsets of keys may be specified in groups of similar keys, e.g., the function keys "F1" through "F12", the number keys "1" to "0" on the upper row of a QWERTY keyboard, the number pad on conventional keyboards, and the like.

The selection of the keys for which monitoring is to be performed results in identifiers of the keys being stored in the key monitoring data structure 350. These identifiers may be compared, by the smart keyboard device driver 310, to identifiers of keys over which the sensors of the smart keyboard 330 indicate that a user's finger tips are currently in close proximity. Such identifiers may be provided in input signals from the smart keyboard 330 in response to the sensors associated with the keys of the smart keyboard 330 detecting the presence of a user's finger tips in close proximity to the keys of the smart keyboard 330.

Based on the results of the comparison, for those key identifiers that match key identifiers in the key monitoring data structure 350, the smart keyboard device driver 310 instructs the visual guide generation application 360 to generate a visual guide on a display 370 of the host system 300. This visual guide may take many different forms.

In one illustrative embodiment, this visual guide is provided as a ghost or opaque graphical image of a character or characters corresponding to the key or keys over which the user's finger tips are detected to be in close proximity. For example, if the user's finger is currently over the "F3" key of the smart keyboard 330, an image of the "F3" key may be displayed on the display device 370 as a ghost or opaque image through which other elements of the display may still be visible. In other alternatives, a visual display of the entire keyboard 330 may be provided on the display device 370 with the keys over which the user's finger tips are detected being highlighted or otherwise emphasized in the visual display of the keyboard. The keyboard display may be provided as a ghost or opaque image or may be provided as a non-ghost or opaque image in a designated position of the display 370, as discussed above.

As mentioned above, the user may specify a time period between a first detection of a user's finger tip over a key or keys and actual presentation of the visual guide. In this way, one can discern between detection of finger tips resting over keys and incidental detection of a user's finger tips in the selection of keys of the keyboard. This delay period is user adjustable so as to control the sensitivity of the detection by the smart keyboard 330.

In an alternative embodiment, rather than performing a comparison of the key identifiers received from inputs of the smart keyboard 330, the smart keyboard device driver 310 may provide control inputs to the smart keyboard 330 to enable/disable sensors of keys in the smart keyboard 330. Based on inputs from the user via the graphical user interface application 340 to select certain keys of the smart keyboard 330, the smart keyboard device driver 310 sends control signals to the smart keyboard 330 to enable only those sensors associated with the selected keys. In this way, only the sensors associated with the selected keys will provide inputs to the smart keyboard device driver 310 to indicate the presence of the user's finger tips in close proximity to these keys. With subsequent operation, comparisons will not be necessary since only those keys that have been selected will provide such input signals and thus, the visual guides may be displayed without comparisons by the device driver 310 and without the need to store data in the key monitoring data structure 350.

Figure 4:
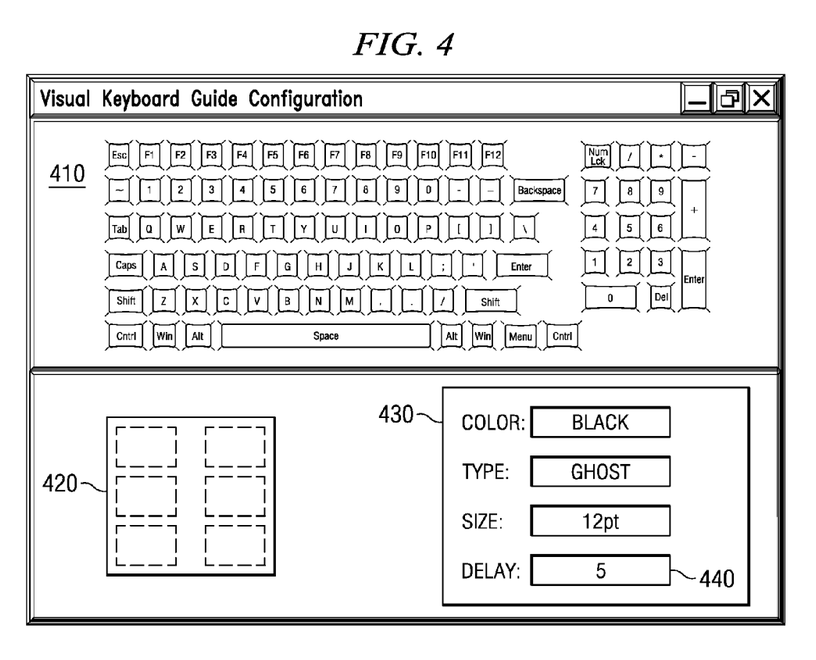
FIG. 4 is an exemplary diagram illustrating a graphical user interface through which selection of keys for visual guides may be made in accordance with one illustrative embodiment.

FIG. 4 is an exemplary diagram illustrating a graphical user interface through which selection of keys for visual guides may be made in accordance with one illustrative embodiment. As shown in FIG. 4, the graphical user interface includes a portion 410 for selecting individual keys, subsets of keys, or the like, for which monitoring for the presence of a user's finger tips in close proximity is desired. The graphical user interface further includes a portion 420 for selecting a portion of the display where the visual guide is to be displayed, a portion 430 for selecting visual characteristics of the visual guides, and a portion 440 for selecting a delay time between detection of the user's finger tips and display of the visual guide. The user may interact with the graphical user interface via the smart keyboard, a computer mouse, or other input device. Based on the user's selections via this graphical user interface, visual guides are presented by the visual guide generation application 360 in response to instructions from the smart keyboard device driver 310.

Figure 5:
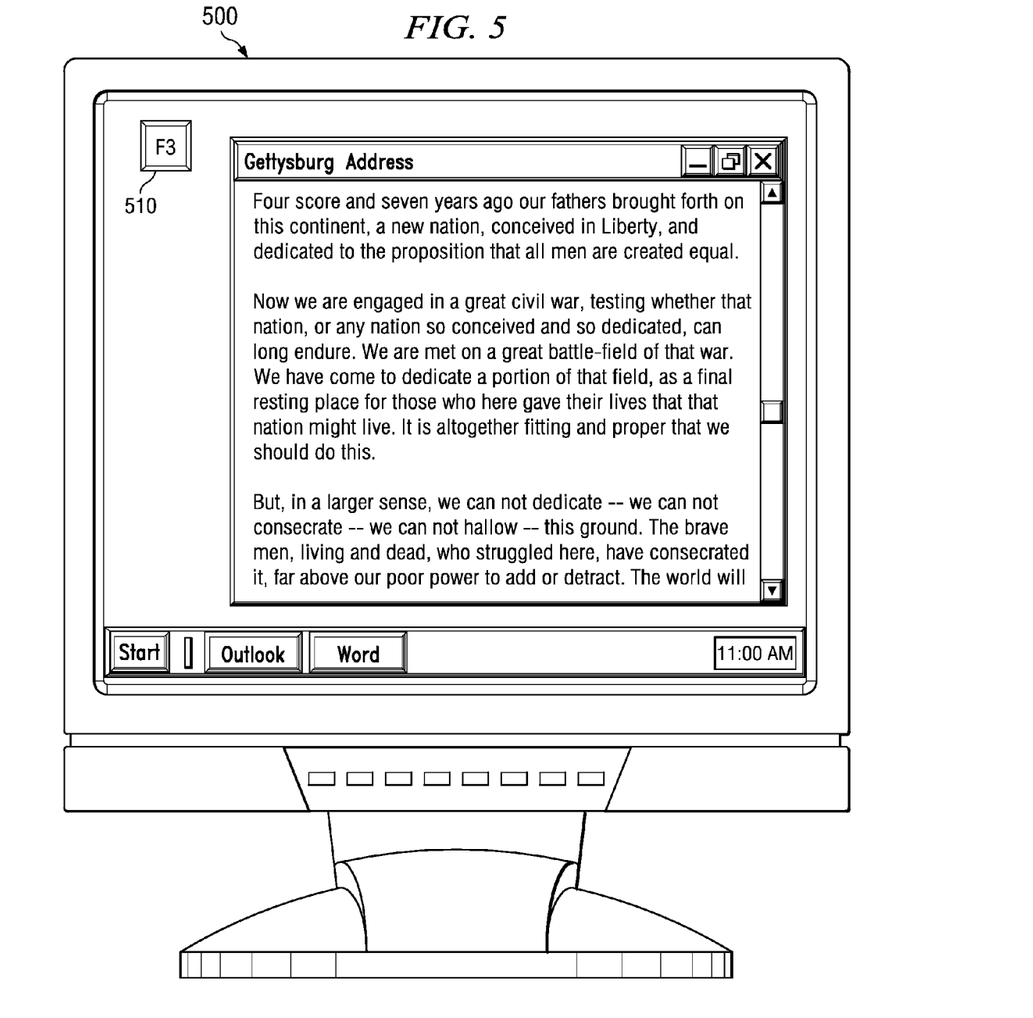
FIG. 5 is an exemplary diagram illustrating a display of a data processing device in which a visual guide for a smart keyboard is displayed in accordance with one illustrative embodiment.

FIG. 5 is an exemplary diagram illustrating a display of data processing device in which a visual guide for a smart keyboard is displayed in accordance with one illustrative embodiment. As shown in FIG. 5, the visual guide 510 comprises a graphical image of a key of a keyboard with a character representation corresponding to the key over which the user's finger tip is currently detected, e.g., key "F3". It should be appreciated that multiple visual guides such as this may be displayed on the display depending upon how many keys for which monitoring is desired and how many keys detect a user's finger tip presence. The visual guide 510 is provided in a user specified portion of the display 500 and may be moved, such as by dragging and dropping the visual guide 510, specifying a new position via a graphical user interface, or the like.

It should be appreciated that this representation of the visual guide 510 is only exemplary and is not intended to state or imply any limitations with regard to the types of visual guides that may be used with the present invention. Many modifications to the example shown in FIG. 5 may be made without departing from the spirit and scope of the present invention.

While the visual guide shown in FIG. 5 is shown as a separate element on the display 500, the illustrative embodiments are not limited to such. Rather, in a further illustrative embodiment, existing characters being visually represented on the display of the computing device may be used to provide the visual guide. That is, for example, if a document is being displayed, such as part of a word processing application instance running on the data processing device, existing instances of a character in the document may be highlighted or otherwise emphasized to indicate the current position of the user's finger tips over keys of the keyboard.

With such an embodiment, the text of the currently active portion of the display, e.g., the currently active window being visually represented on the display, may be analyzed to identify instances of a character corresponding to a character associated with a key over which the user's finger tip is detected as being present. One or more instances of the character in the active portion of the display may then be identified and highlighted in the display, such as by changing a color of the character, a size of the character, a font of the character, italicizing, underlining, or bolding the character, changing of a capitalization state of the character, or any other means by which the character may be emphasized in the display of the active portion of the display. Alternatively, such analysis may be applied to non-active portions of the display or both active and non-active portions of the display.

Figure 6:
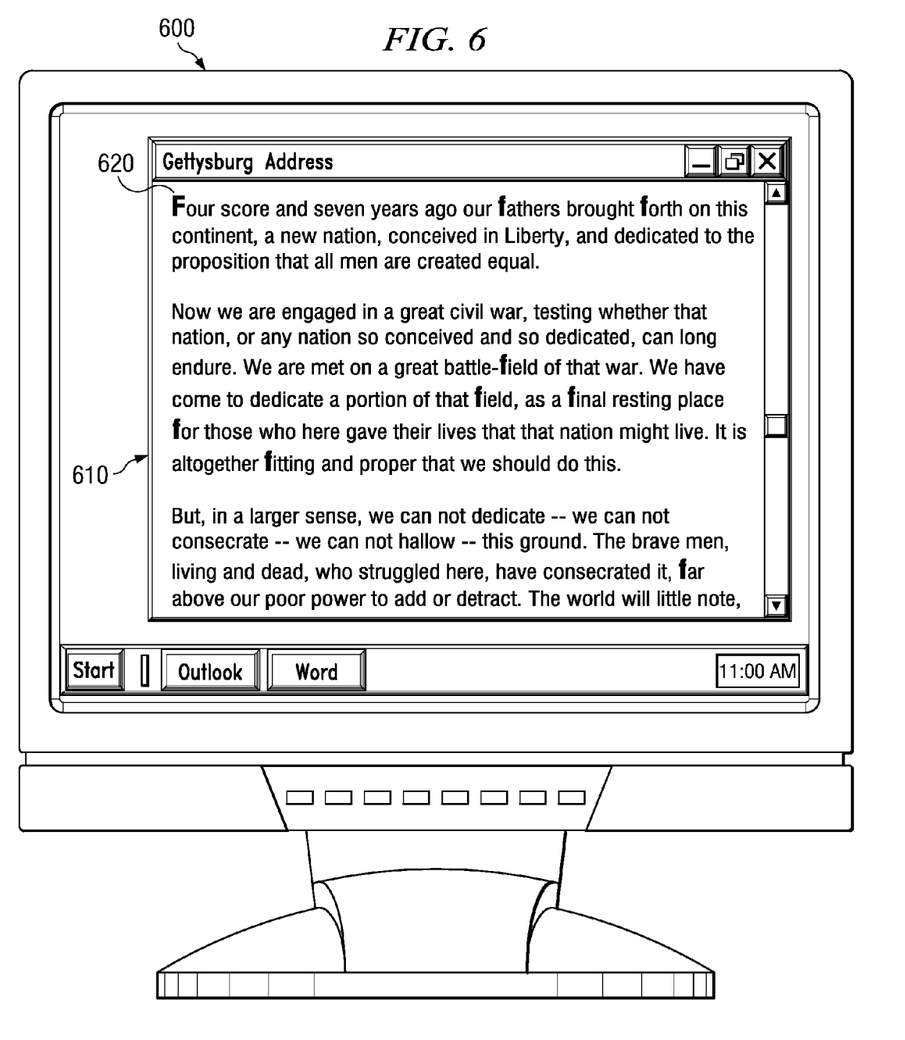
FIG. 6 is an exemplary diagram illustrating a display of a data processing device in which existing characters on the display are used to provide a visual guide for a smart keyboard in accordance with one illustrative embodiment.

FIG. 6 is an exemplary diagram illustrating a display of a data processing device in which existing characters on the display are used to provide a visual guide for a smart keyboard in accordance with one illustrative embodiment. As shown in FIG. 6, an active window 610 being visually represented on the display 600 contains the text of the Gettysburg Address. In the depicted example, the user has his/her finger tip positioned over the "F" key on the smart keyboard and thus, the smart keyboard detects the presence of the user's finger tip in association with the "F" key. This information is provided to the device driver for the smart keyboard which then either itself or through a separate application, analyzes the text being displayed by the display 600 to determine if the text has any characters matching the character over which the user's finger tip is detected to be present.

If instances of a character matching the character over which the user's finger tip is detected are determined to be present, one or more instances of that character in the text are emphasized in the visual representation. Such emphasis may be performed by sending signals to the display device driver to cause those instances of the character to have its characteristics modified in the visual representation being presented by the display. In this way, while the characters may be emphasized in the visual representation, the modification of the visual representation does not affect the actual data being represented, e.g., the document file.

In the depicted example, only the active window 610 is analyzed in this manner and the resulting instances 620 of the character "F" are emphasized through bolding and increasing the size of the character in the visual representation of the active window 610. It should be noted, however, that the illustrative embodiments are not limited to such and either or both of active windows and non-active windows may be analyzed and their text emphasized in the manner described above. Moreover, other portions of the graphical user interface, e.g., toolbars, drop-down menus, virtual buttons, etc., provided by the data processing device may be analyzed and emphasized in this manner as well.

Figure 7:
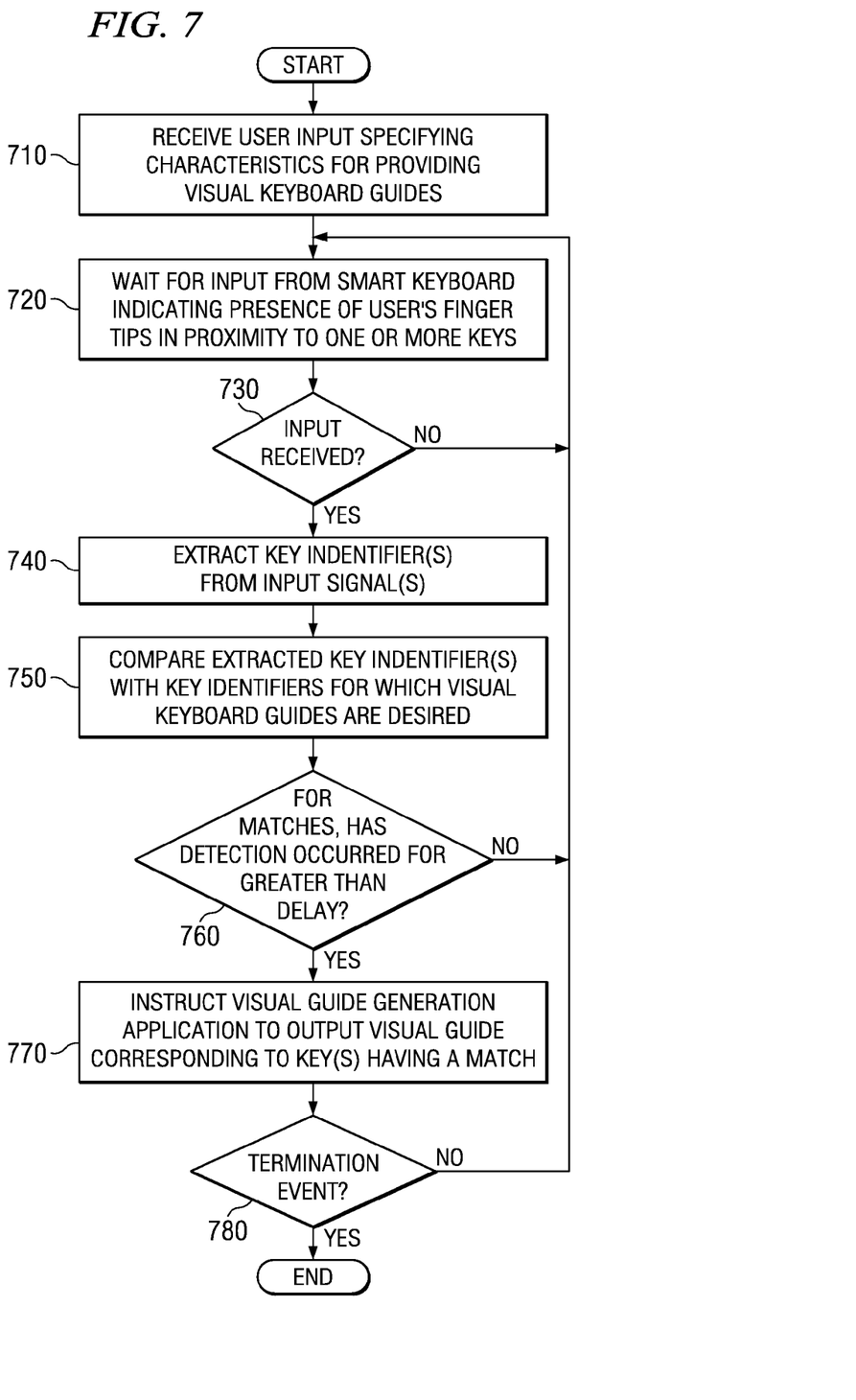
FIG. 7 is a flowchart outlining an exemplary operation of a smart keyboard device driver in accordance with one illustrative embodiment.

FIG. 7 is a flowchart outlining an exemplary operation of a smart keyboard device driver in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts with the device driver receiving user input via a graphical user interface, or the like, specifying characteristics for providing visual guides for a smart keyboard (step 710). Included in these characteristics is the specification of which key or keys are to be monitored for the presence of a user's finger tips in close proximity to the key or keys.

The operation then waits for input from the smart keyboard indicating the presence of a user's finger tips in proximity to one or more keys (step 720). If an input signal is received (step 730), a key identifier or key identifiers corresponding to the key or keys over which the user's finger tips are detected is extracted from the input signal (step 740). The key identifier (s) are compared against a data structure storing key identifiers for which visual guides are to be provided (step 750). Alternatively, if the smart keyboard is programmed to only sense the presence of a user's finger tips over keys selected by a user, this comparison may be eliminated from the operation.

For those key identifiers matching key identifiers in the data structure, a determination is made as to whether the detection of the user's finger tip has continued for a time period greater than a user selectable delay (step 760). If not, the operation returns to step 720. If so, then the device driver instructs a visual guide generation application to output a visual guide corresponding to the key or keys (step 770).

The operation then determines if a termination event occurs (step 780). This termination event may be a powering off of the computer, a disabling of the monitoring in the smart keyboard, an activation of the graphical user interface application for modifying the settings associated with presentation of the visual guides, or the like. If a termination event occurs, the operation terminates. Otherwise, if a termination event has not occurred, the operation returns to step 720.

Thus, the mechanisms of the illustrative embodiments provide visual keyboard guides according to programmable settings. The mechanisms of the illustrative embodiments allow a user to specify for which keys of a smart keyboard visual guides are to be provided. Moreover, the illustrative embodiments allow a user to specify other characteristics of the visual guides that may be provided to the user via a display associated with a data processing device or system. In addition, the mechanisms of the illustrative embodiments may be used to program the smart keyboard so as to enable/disable sensors in the smart keyboard such that only those keys desired to be monitored by the user have their sensors enabled.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing device, for providing visual keyboard guides, comprising:
    receiving an input specifying one or more keys of a smart keyboard, less than a total number of keys of the smart keyboard, for which visual guides are to be provided in response to detecting a presence of a user's instrument over the one or more keys; and
    storing an identifier of the one or more keys in a data structure for use in determining if visual keyboard guides are to be provided for the at least one key of the smart keyboard;
    receiving an input from the smart keyboard indicating at least one key of the smart keyboard with which a user's instrument is in proximity, the smart keyboard having sensors for detecting a presence of the user's instrument in proximity to the at least one key of the smart keyboard;
    determining if visual keyboard guides are to be provided for the at least one key of the smart keyboard based on a comparison of the at least one key to identifiers of one or more keys in the data structure;
    outputting a visual keyboard guide on a display of the data processing device if visual keyboard guides are to be provided for the at least one key of the smart keyboard, wherein a visual keyboard guide is not output for the at least one key if the at least one key does not match an identifier of one or more keys in the data structure; and
    sending a control signal to the smart keyboard to turn on/off sensors of the smart keyboard based on the user input specifying the one or more keys, wherein the control signal causes sensors associated with the one or more keys specified in the user input to be turned on and sensors associated with keys that are not in the one or more keys specified by the user input to be turned off.

2. The method of claim 1, wherein the visual keyboard guide is one of an opaque image represented on the display having a displayed character matching a character corresponding to the at least one key or a visual display of a keyboard with the at least one key being emphasized in the visual display of the keyboard.

3. The method of claim 1, further comprising:
    receiving user input specifying a delay time for indicating the presence of the user's instrument over keys of the smart keyboard, wherein the presence of the user's instrument over keys of the smart keyboard must be detected by sensors of the smart keyboard for a time corresponding to the delay time before the smart keyboard sends an input to the data processing device.

4. The method of claim 1, wherein the smart keyboard detects a presence of the user's instrument in proximity to the at least one key of the smart keyboard using at least one of a pressure sensor, a heat sensor, a light beam based sensor, or a motion sensor.

5. The method of claim 1, wherein the smart keyboard is a light projected virtual keyboard that is projected onto a flat surface using a light source.

6. The method of claim 1, further comprising:
    providing a first portion of a user interface for specifying which keys of the smart keyboard are associated with visual guides to be output by the display in response to detecting the presence of the user's instrument over the keys of the smart keyboard;
    providing a second portion of a user interface for specifying a portion of a visual representation generated by the display in which the visual guides are to be output; and
    providing a third portion of the user interface for specifying characteristics of the visual guides to be output.

7. The method of claim 1, wherein the user's instrument is one of a finger tip, a prosthetic device, a pointing device, or a stylus.

8. A computer program product comprising a computer useable storage medium having a computer readable program stored thereon, wherein the computer readable program, when executed on a data processing device, causes the data processing device to:
    receive an input specifying one or more keys of a smart keyboard, less than a total number of keys of the smart keyboard, for which visual guides are to be provided in response to detecting a presence of a user's instrument over the one or more keys; and
    store an identifier of the one or more keys in a data structure for use in determining if visual keyboard guides are to be provided for the at least one key of the smart keyboard;
    receive an input from the smart keyboard indicating at least one key of the smart keyboard with which a user's instrument is in proximity, the smart keyboard having sensors for detecting a presence of the user's instrument in proximity to the at least one key of the smart keyboard;
    determine if visual keyboard guides are to be provided for the at least one key of the smart keyboard based on a comparison of the at least one key to identifiers of one or more keys in the data structure;

output a visual keyboard guide on a display of the data processing device if visual keyboard guides are to be provided for the at least one key of the smart keyboard, wherein a visual keyboard guide is not output for the at least one key if the at least one key does not match an identifier of one or more keys in the data structure; and send a control signal to the smart keyboard to turn on/off sensors of the smart keyboard based on the user input specifying the one or more keys, wherein the control signal causes sensors associated with the one or more keys specified in the user input to be turned on and sensors associated with keys that are not in the one or more keys specified by the user input to be turned off.

9. The computer program product of claim 8, wherein the visual keyboard guide is one of an opaque image represented on the display having a displayed character matching a character corresponding to the at least one key or a visual display of a keyboard with the at least one key being emphasized in the visual display of the keyboard.

10. The computer program product of claim 8, wherein the computer readable program causes the data processing device to output the visual keyboard guide on the display of the data processing device by:

identifying a character currently being output by the display, in a visual representation of a textual document, that corresponds to a character associated with the at least one key of the smart keyboard; and emphasizing, in the output of the display, a representation of the character, within the visual representation of the textual document, currently being output by the display.

11. The computer program product of claim 8, wherein the computer readable program further causes the data processing device to:

receive user input specifying a delay time for indicating the presence of the user's instrument over keys of the smart keyboard, wherein the presence of the user's instrument over keys of the smart keyboard must be detected by sensors of the smart keyboard for a time corresponding to the delay time before the smart keyboard sends an input to the data processing device.

12. The computer program product of claim 8, wherein the smart keyboard detects a presence of the user's instrument in proximity to the at least one key of the smart keyboard using at least one of a pressure sensor, a heat sensor, a light beam based sensor, or a motion sensor.

13. An apparatus, comprising:

a processor;

and a memory coupled to the processor, wherein the memory comprises instructions which, when executed by the processor, cause the processor to:

receive an input specifying one or more keys of a smart keyboard, less than a total number of keys of the smart keyboard, for which visual guides are to be provided in response to detecting a presence of a user's instrument over the one or more keys;

store an identifier of the one or more keys in a data structure for use in determining if visual keyboard guides are to be provided for the at least one key of the smart keyboard;

receive an input from the smart keyboard indicating at least one key of the smart keyboard with which a user's instrument is in proximity, the smart keyboard having sensors for detecting a presence of the user's instrument in proximity to the at least one key of the smart keyboard;

determine if visual keyboard guides are to be provided for the at least one key of the smart keyboard based on a comparison of the at least one key to identifiers of one or more keys in the data structure;

output a visual keyboard guide on a display associated with the apparatus, if visual keyboard guides are to be provided for the at least one key of the smart keyboard, wherein a visual keyboard guide is not output for the at least one key if the at least one key does not match an identifier of one or more keys in the data structure; and send a control signal to the smart keyboard to turn on/off sensors of the smart keyboard based on the user input specifying the one or more keys, wherein the control signal causes sensors associated with the one or more keys specified in the user input to be turned on and sensors associated with keys that are not in the one or more keys specified by the user input to be turned off.

* * * * *